(12) United States Patent
Behrostaghi et al.

(10) Patent No.: US 11,948,360 B2
(45) Date of Patent: Apr. 2, 2024

(54) IDENTIFYING REPRESENTATIVE FRAMES IN VIDEO CONTENT

(71) Applicant: NETFLIX, INC., Los Gatos, CA (US)

(72) Inventors: Shervin Ardeshir Behrostaghi, Campbell, CA (US); Nagendra K. Kamath, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 200 days.

(21) Appl. No.: 17/344,752

(22) Filed: Jun. 10, 2021

(65) Prior Publication Data

US 2021/0390315 A1 Dec. 16, 2021

Related U.S. Application Data

(60) Provisional application No. 63/038,044, filed on Jun. 11, 2020.

(51) Int. Cl.
*G06V 20/40* (2022.01)
*G06V 40/16* (2022.01)

(52) U.S. Cl.
CPC .............. *G06V 20/47* (2022.01); *G06V 20/49* (2022.01); *G06V 40/172* (2022.01)

(58) Field of Classification Search
CPC ...... G06V 10/764; G06V 10/82; G06V 20/47; G06V 20/49; G06V 40/16; G06V 40/172
See application file for complete search history.

(56) References Cited

U.S. PATENT DOCUMENTS

2008/0019661 A1 1/2008 Obrador et al.
2012/0263433 A1* 10/2012 Mei .................... G06Q 30/0276
386/E5.003

FOREIGN PATENT DOCUMENTS

WO 2019/018434 A1 1/2019

OTHER PUBLICATIONS

International Search Report for Application No. PCT/US2021/036970 dated Sep. 8, 2021.

* cited by examiner

*Primary Examiner* — Ruiping Li
(74) *Attorney, Agent, or Firm* — Artegis Law Group, LLP

(57) ABSTRACT

One embodiment of the present invention sets forth a technique for selecting a frame of video content that is representative of a media title. The technique includes applying an embedding model to a plurality of faces included in a set of frames of the video content to generate a plurality of face embeddings. The technique also includes aggregating the plurality of face embeddings into a plurality of clusters representing a plurality of characters included in the media title. The technique further includes computing a plurality of prominence scores for the plurality of characters based on one or more attributes of the plurality of clusters, and selecting, from the set of frames, a frame of video content as representative of the media title based on one or more prominence scores for one or more characters included in the frame.

18 Claims, 4 Drawing Sheets

IDENTIFYING REPRESENTATIVE FRAMES IN VIDEO CONTENT

CROSS-REFERENCE TO RELATED APPLICATIONS

This application claims benefit of United States Provisional Patent Application titled "OBJECT-BASED VIDEO THUMBNAIL RETRIEVAL," filed Jun. 11, 2020 and having Ser. No. 63/038,044. The subject matter of this related application is hereby incorporated herein by reference.

BACKGROUND

Field of the Various Embodiments

Embodiments of the present disclosure relate generally to analysis of video content and, more specifically, to identifying representative frames in video content.

Description of the Related Art

A video streaming service is typically designed to provide users with access to one or more libraries of various media titles. To access a given media title, a user usually connects to the video streaming service via an endpoint device, such as a laptop computer, smart television, tablet computer, or similar device. The user can then select the given media title via a graphical user interface (GUI) that is displayed on the endpoint device and configured to allow users to make selections from one or more libraries of media titles. Upon selecting the given media title, the server machines that host the media title stream media content associated with the media title to the endpoint device. The media content generally includes frames of video, subtitle, and/or audio data encoded with specific bitrates, encoding formats, and/or other encoding settings.

Within the GUI of a video streaming service, a given media title is frequently represented by "artwork," which includes a still image that serves as an introduction, preview, or summary of the media title. For example, the GUI could include a grid, a list, or another arrangement of posters, thumbnails, or other artwork for various media titles provided by the video streaming service. Each piece of artwork could include a video frame that depicts important characters, settings, themes, emotions, subjects, or other attributes of the corresponding media title.

To produce artwork that is both representative of important attributes of a media title and encourages users to select the media title within the GUI, the still image included in the artwork is typically selected via a time-consuming, manual, and inefficient process. During this process, a media specialist interacts with an application to iterate over individual frames of video content in the media title. After reviewing some or all frames in the video content, the media specialist selects one or more frames as candidates for inclusion in artwork for the media title. The artwork can then be created by editing (e.g., cropping, applying color adjustments to, compositing, etc.) one or more selected frames and adding text to the edited frame(s).

Further, this manual process of selecting frames for inclusion in artwork is unable to scale with an increase in the number of media titles added to the video streaming service. For example, a media specialist could spend multiple hours reviewing tens of thousands or hundreds of thousands of frames of video content in a media title before selecting one or more frames for inclusion in artwork for the media title. A fixed-size or slowly growing team of media specialists would thus be unable to select frames for inclusion in artwork for media titles quickly enough to support a more rapid growth in the number of media titles added to the video streaming service on a periodic basis.

As the foregoing illustrates, what is needed in the art are more effective techniques for identifying video frames that are representative of the corresponding media titles.

SUMMARY

One embodiment of the present invention sets forth a technique for selecting a frame of video content that is representative of a media title. The technique includes applying an embedding model to a plurality of faces included in a set of frames of the video content to generate a plurality of face embeddings. The technique also includes aggregating the plurality of face embeddings into a plurality of clusters representing a plurality of characters included in the media title. The technique further includes computing a plurality of prominence scores for the plurality of characters based on one or more attributes of the plurality of clusters, and selecting, from the set of frames, a frame of video content as representative of the media title based on one or more prominence scores for one or more characters included in the frame.

One technical advantage of the disclosed techniques relative to the prior art is that, with the disclosed techniques, a subset of frames in video content for a media title can be automatically and efficiently identified as suitable for use in artwork for the media title. Accordingly, the disclosed techniques are faster, more scalable, and incur less resource overhead than prior art techniques that involve individual users interacting with applications to manually review and select video frames in media titles as candidates for artwork. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
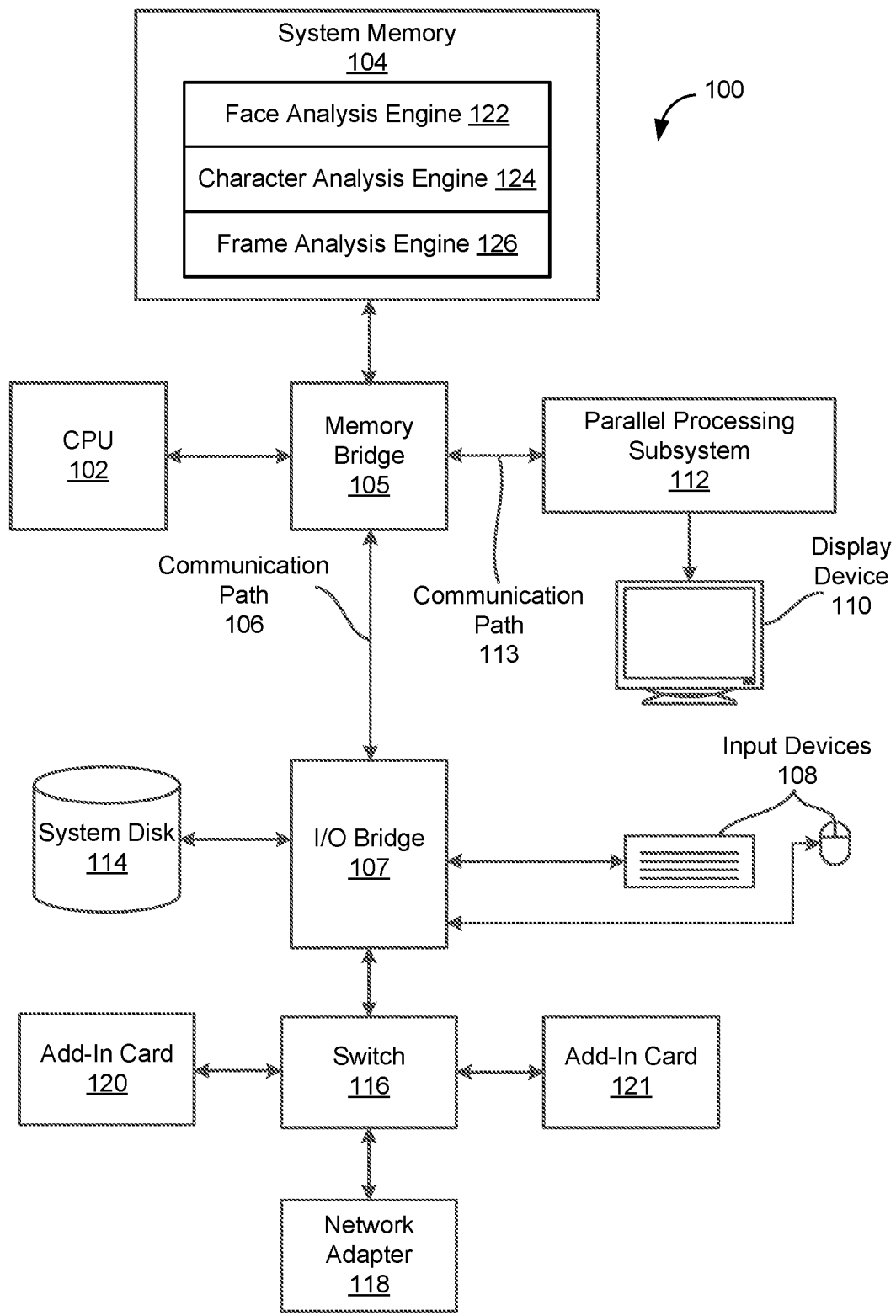
FIG. 1 is a block diagram illustrating a computer system configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

Media titles such as films and television shows are frequently represented in video streaming services and other computer programs by artwork that includes still images from video content in the media titles. For example, a GUI of a video streaming service could display a grid, a list, or another arrangement of posters, thumbnails, or other artwork for various media titles provided by the video streaming service. Each piece of artwork could include content from a video frame in a corresponding media title. The content could depict key characters, settings, themes, emotions, subjects, or other attributes of the corresponding media title. Each piece of artwork could also include a title and/or description for the corresponding media title. Because the artwork provides a summary, preview, or introduction to the media titles within the GUI, each piece of artwork may influence a user's decision to purchase, click on, play, ignore, upvote, downvote, or otherwise respond to the corresponding media title.

To reduce time, effort, and overhead associated with selecting frames in a media title for use in artwork for the media title, the disclosed techniques apply a number of machine learning techniques to some or all frames of video content in the media title to produce multiple types of scores. One type of score includes a prominence score that represents the frequency with which a character appears in the media title. The prominence score may be calculated by using an embedding model to generate embeddings of faces in the video content, using a clustering technique to group the embeddings into clusters representing different characters in the media title, and normalizing the count of embeddings in each cluster by the number of frames in the video content in which faces of characters appear.

When the embeddings and clusters indicate that two characters appear in the same frame or within a certain number of frames of one another, an interaction score representing the amount of interaction between the characters may be calculated. The interaction score may be calculated as the number of frames in which one character is found in the same frame as another character and/or occurs within a prespecified number of frames from the other character, normalized by the number of frames in the video content in which faces of characters appear.

The disclosed techniques are further configured to calculate a face score for each face found in the frames of video content. The face score may be produced by a convolutional neural network and/or another type of machine learning model. The machine learning model is trained to distinguish between a first set of faces included in a first set of frames that are selected for inclusion in artwork for one or more media titles and a second set of faces included in a second set of frames that are not selected for inclusion in artwork for the same or different media titles. The machine learning model thus outputs, for a given crop of a face, a score between 0 and 1 indicating the appropriateness of the face for use in artwork for a media title.

The prominence, interaction, and/or face scores associated with characters in a frame can then be combined into an overall frame score representing the suitability of the frame for use in artwork for the media title. For example, the prominence score and/or face score for each character in the frame could be scaled by the area occupied by the character's face divided by the area occupied by all faces in the frame. The overall frame score could then be calculated as a weighted combination of the scaled and/or unscaled prominence, interaction, and face scores associated with faces in the frame. Each weight used in the weighted combination could represent the relative importance of the corresponding score to the overall frame score.

Overall frame scores for some or all frames of video content in the media title are then used to select one or more frames as candidates for inclusion in artwork for the media title. For example, the frames could be ranked by descending overall frame score, and a certain number of highest ranking frames and/or a variable number of frames with overall frame scores that exceed a threshold could be identified as candidates for artwork. The candidates could then be outputted in an application to users that produce the artwork. The users could then add portions of one or more outputted frames to the artwork, edit (e.g., cropping, applying color adjustments to, compositing, etc.) the added portions within the artwork, add text to the edited frame(s), and/or perform other image- or text-processing operations to produce the artwork.

One technical advantage of the disclosed techniques relative to the prior art is that, with the disclosed techniques, a subset of frames in video content for a media title can be automatically and efficiently identified as suitable for use in artwork for the media title. Accordingly, the disclosed techniques are faster, more scalable, and incur less resource overhead than prior art techniques that involve individual users interacting with applications to manually review and select video frames in media titles as candidates for artwork. These technical advantages provide one or more technological advancements over prior art approaches.

System Overview

FIG. 1 is a block diagram illustrating a computer system 100 configured to implement one or more aspects of various embodiments. In some embodiments, computer system 100 is a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Bluray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed and/or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute a face analysis engine 122, a character analysis engine 124, and a frame analysis engine 126 that reside in system memory 104. Face analysis engine 122, character analysis engine 124, and frame analysis engine 126 may be stored in system disk 114 and/or other storage and loaded into system memory 104 when executed.

More specifically, face analysis engine 122, character analysis engine 124, and frame analysis engine 126 identify a subset of frames in video content for a media title as "representative" of the media title. These representative frames may be outputted as candidates for inclusion in thumbnails, posters, or other artwork for the media title. As described in further detail below, face analysis engine 122 uses one or more machine learning models to generate embeddings of faces in frames of video content and/or classify the faces as suitable or unsuitable for use in artwork for a corresponding media title. Character analysis engine 124 performs clustering of the embeddings to identify groups of faces that belong to the same character. Character analysis engine 124 also characterizes the prominence of each character in the media title based on the frequency with which the character occurs in frames that include characters' faces. Character analysis engine 124 further determines the level of interaction between two characters based on the characters' co-occurrences in the frames of video content. Frame analysis engine 126 then combines the output of face analysis engine 122 and/or character analysis engine 124 into an overall score for each frame of video content. This overall score indicates the suitability or lack of suitability of the frame for use in artwork for the media title. Finally, frame analysis engine 126 selects one or more frames with high overall scores may then be selected as representative of the media title.

Identifying Representative Frames in Video Content

Figure 2:
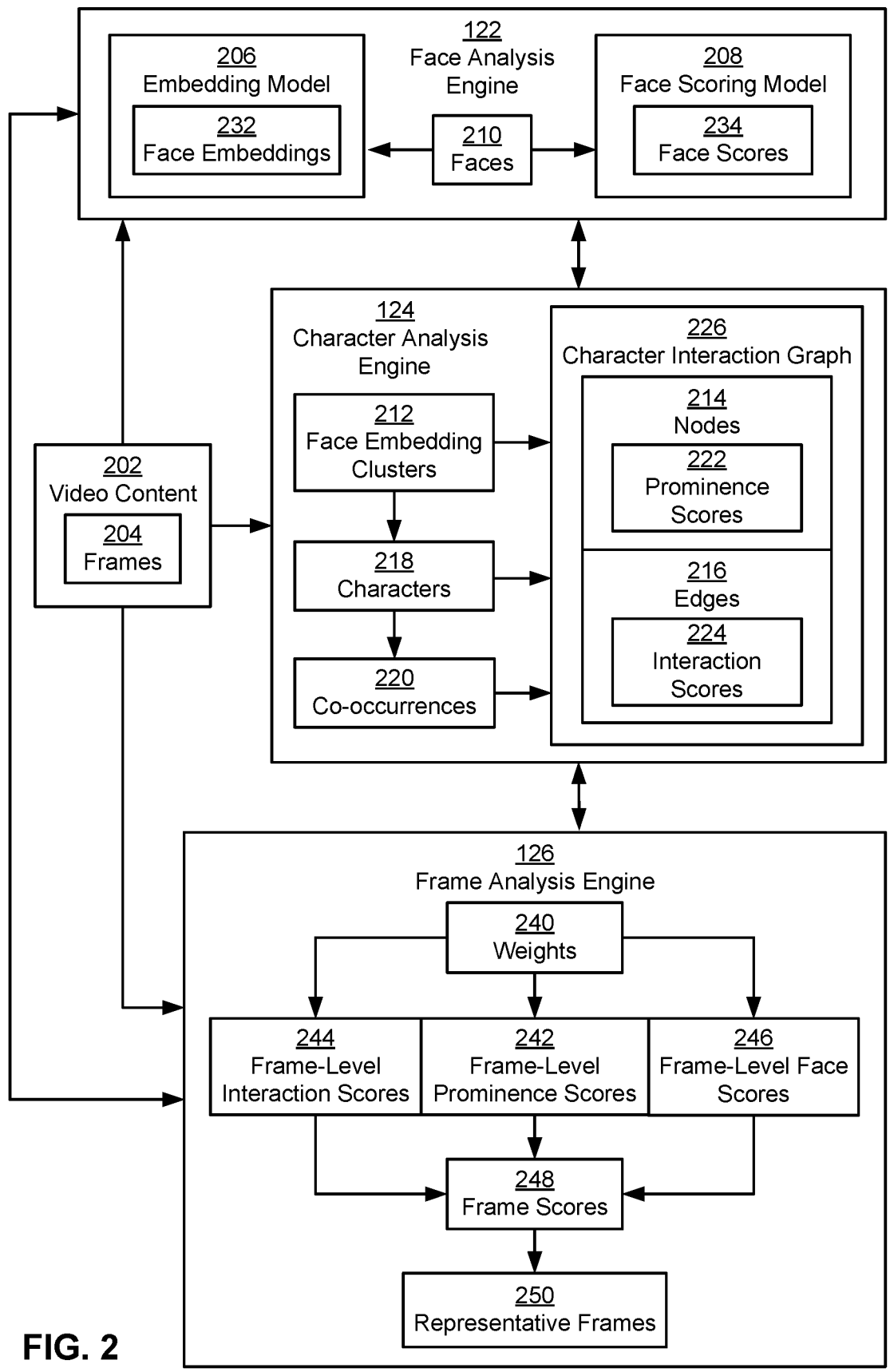
FIG. 2 is a more detailed illustration of the face analysis engine, character analysis engine, and frame analysis engine of FIG. 1, according to various embodiments.

FIG. 2 is a more detailed illustration of face analysis engine 122, character analysis engine 124, and frame analysis engine 126 of FIG. 1, according to various embodiments. As mentioned above, face analysis engine 122, character analysis engine 124, and frame analysis engine 126 perform analysis related to frames 204 of video content 202 for a media title (e.g., a television show, a movie, etc.) to identify a subset of frames 204 as representative frames 250 that are candidates for inclusion or use in artwork for the media title.

In some embodiments, frames 204 inputted into face analysis engine 122, character analysis engine 124, and/or frame analysis engine 126 include some or all video content 202 in the media title. For example, frames 204 could include all frames of video content 202 in the media title; a subset of video content 202 that includes faces 210 of some or all human or non-human characters in the media title; a subset of video content 202 that includes certain objects, settings, themes, colors, textures, or shapes in the media title; a subset of video content 202 from one or more scenes or shots in the media title, a subset of video content 202 that is selected by a user and/or machine learning model, and/or another selection of video frames 204 included in the media title.

Face analysis engine 122 identifies and/or extracts portions of frames 204 that include faces 210. For example, face analysis engine 122 could use a face-detection technique to identify faces 210 in frames 204 and generate crops of the identified faces 210 in frames 204. Face analysis engine 122 could also, or instead, obtain crops of faces 210 from another component and/or a repository.

Next, face analysis engine 122 applies an embedding model 206 to faces 210 to produce face embeddings 232. For example, face analysis engine 122 could use a convolutional neural network, residual neural network, and/or another type of embedding model 206 to convert pixel values in a crop of each face into a face embedding that is a fixed-length vector representation of the face's visual attributes in a lower-dimensional latent space. Embedding model 206 could be trained using triplets of faces, where each triplet includes two faces from the same person or character and one face from a different person or character. Embedding model 206 could further be trained using a triplet loss, contrastive loss, and/or another type of loss that increases with the distance between two embeddings of faces from the same person or character and decreases with the distance between two embeddings of faces from different people or characters. After embedding model 206 is trained, embeddings produced by embedding model 206 from faces of the same person or character are closer together in the latent space than embeddings produced by embedding model 206 from faces of different people or characters.

Face analysis engine 122 also applies a face scoring model 208 to faces 210 in video content 202 to generate face scores 234 indicating whether or not faces 210 are suitable for use in artwork for the media title. Face scoring model 208 may be trained to distinguish between a first set of faces in frames that are selected by users as artwork for a set of media titles and a second set of faces in frames that are not selected by users as artwork for the same media titles or different media titles. For example, face scoring model 208 could include a convolutional neural network and/or another type of deep learning model. Training data for face scoring model 208 could include the first set of faces and a corresponding label of 1. Training data for face scoring model 208 could also include the second set of faces and a corresponding label of 0. During training of face scoring model 208, parameters of face scoring model 208 are updated so that face scores 234 generated by face scoring model 208 from the faces in the training data are substantially the same as or are close to the corresponding labels. The trained face scoring model 208 could then be used to generate face scores 234 from faces 210 in frames 204 of video content 202. In turn, each face score includes a value between 0 and 1 that represents the likelihood that a corresponding face includes attributes (e.g., facial expression, sharpness, lighting, etc.) that are suitable for use in artwork for the media title.

Character analysis engine 124 aggregates face embeddings 232 outputted by embedding model 206 from faces 210 into face embedding clusters 212 that represent characters 218 in the media title. For example, character analysis engine 124 could generate face embedding clusters 212 using an agglomerative clustering technique. The agglomerative clustering technique initially assigns each face embedding to a different face embedding cluster and merges pairs of face embedding clusters 212 that are within a threshold distance from one another. In this example, the threshold could be selected to ensure near-perfect precision for face embeddings 232 that fall within the corresponding distance. Thus, each face embedding cluster produced by character analysis engine 124 may represent a different character in the media title, and face embeddings 232 in the face embedding cluster may represent instances of the character's face in frames 204 of video content 202 for the media title.

After face embedding clusters 212 are created, character analysis engine 124 uses attributes of face embedding clusters 212 to calculate prominence scores 222 for the corresponding characters 218 in the media title. In one or more embodiments, each prominence score represents the relative prominence of a corresponding character in the media title and is inferred based on the frequency of the character's appearance in the media title. For example, character analysis engine 124 could compute the prominence score for a character as the size of the face embedding cluster associated with the character, normalized (e.g., divided) by the total number of frames 204 that include at least one face.

Character analysis engine 124 also uses co-occurrences 220 of characters 218 in frames 204 to calculate interaction scores 224 between pairs of characters 218. For example, character analysis engine 124 could use mappings between face embeddings 232 in face embedding clusters 212 and frames 204 to identify frames 204 in which each character appears. Character analysis engine 124 could determine co-occurrences 220 of each pair of characters 218 as the number of frames in which both characters appear and/or the number of frames in which one character in the pair appears within a prespecified number of frames from the other character in the pair (e.g., to account for characters that appear in the same scene but not necessarily in the same frame or shot). Character analysis engine 124 could then calculate an interaction score for the pair of characters as the count of co-occurrences 220 for the pair, normalized (e.g., divided) by the total number of frames 204 that include at least one face.

Character analysis engine 124 further stores prominence scores 222 and interaction scores 224 in a character interaction graph 226 for frames 204 of video content 202. Character interaction graph 226 includes a set of nodes 214 representing characters 218 and a set of edges 216 between pairs of nodes, which represent interactions between pairs of characters 218. Nodes 214 may be associated with prominence scores 222 for the corresponding characters 218, and edges 216 may be associated with interaction scores 224 for the corresponding pairs of characters 218. Character analysis engine 124 and/or another component may search and/or traverse character interaction graph 226 to retrieve prominence scores 222 and/or interaction scores 224 for specific characters 218 and/or pairs of characters 218 in the media title. Character interaction graph 226 is described in further detail below with respect to FIG. 3.

Frame analysis engine 126 generates frame scores 248 for individual frames 204 of video content 202 using the output of face analysis engine 122 and character analysis engine 124. In one or more embodiments, each of frame scores 248 represents the overall suitability (or lack of suitability) of a corresponding frame for use in artwork for the media title. A higher frame score may indicate a greater suitability of the frame for use in the artwork, and a lower frame score may indicate a lower suitability of the frame for use in the artwork.

As shown in FIG. 1, frame analysis engine 126 computes frame scores 248 by combining frame-level prominence scores 242, frame-level interaction scores 244, and/or frame-level face scores 246 for individual frames 204 with a set of weights 240. Each of frame-level prominence scores 242 is calculated from one or more prominence scores 222 for one or more characters in a corresponding frame, and each of frame-level interaction scores 244 is calculated from one or more interaction scores 224 for one or more pairs of characters in a corresponding frame. Each of frame-level face scores 246 is calculated from one or more face scores 234 for one or more faces 210 in a corresponding frame. Weights 240 are used to adjust the contribution of individual prominence scores 222, interaction scores 224, and/or face scores 234 to the corresponding frame-level prominence scores 242, frame-level interaction scores 244, and/or frame-level face scores 246. Weights 240 may also be used to adjust the contributions of frame-level prominence scores 242, frame-level interaction scores 244, and/or frame-level face scores 246 to the corresponding frame scores 248.

In one or more embodiments, frame analysis engine 126 generates a frame-level prominence score for a frame as an aggregation of prominence scores 222 for characters 218 with faces 210 that appear in the frame. For example, frame analysis engine 126 could calculate the frame-level prominence score using the following equation:

$$p_i = \frac{\sum_j a^i_j p^i_j}{\sum_j a^i_j} \qquad (1)$$

In the above equation, $p_i$ represents a frame-level prominence score for frame i. The frame-level prominence score is calculated as a weighted sum of prominence scores 222 $p^i_j$ for characters 218 j in the frame, where each prominence score is scaled by a weight that includes the size (e.g., area) $a^i_j$ of a corresponding character's face divided by the sum of all face sizes $\Sigma_j a^i_j$ in the frame.

In some embodiments, frame analysis engine 126 generates a frame-level interaction score for a frame as an aggregation of interaction scores 224 for pairs of characters in a corresponding frame (e.g., when the frame includes faces for two or more characters 218). Continuing with the above example, frame analysis engine 126 could calculate the frame-level interaction score using the following equation:

$$w_i = \sum_k^{j \neq k} w_{kj} \qquad (2)$$

In the above equation, $w_i$ represents a frame-level interaction score for frame i. The frame-level prominence score is calculated as a sum of interaction scores 224 $w_{kj}$ between pairs of characters 218 denoted by k and j in the frame, where j≠k. The sum is optionally normalized by a weight (not shown in Equation 2) representing the total number of unique pairs of characters in the frame to produce a frame-level interaction score that is an average of interaction scores 224 between pairs of characters 218 in the frame.

In one or more embodiments, frame analysis engine 126 generates a frame-level face score for a frame as an aggregation of face scores 234 for characters 218 with faces 210 that appear in the frame. Continuing with the above example, frame analysis engine 126 could calculate the frame-level face score using the following equation:

$$e_i = \frac{\sum_j a^i_j e^i_j}{\sum_j a^i_j} \qquad (3)$$

In the above equation, $e_i$ represents a frame-level face score for frame i. The frame-level face score is calculated as a weighted sum of face scores 234 $e^i_j$ for faces 210 of characters 218 j in the frame, where each face score is scaled by a weight that includes the size (e.g., area) $a^i_j$ of a corresponding character's face divided by the sum of all face sizes $\Sigma_j a^i_j$ in the frame.

After a frame-level prominence score, a frame-level interaction score, and/or a frame-level face score are calculated for a given frame, frame analysis engine 126 combines the frame-level prominence score, frame-level interaction score, and/or frame-level face score into an overall frame score for the frame. As with calculation of the frame-level prominence score, frame-level interaction score, and/or frame-level face score, frame analysis engine 126 may calculate the overall frame score as a weighted combination and/or another aggregation of the frame-level prominence score, frame-level interaction score, and/or frame-level face score.

Continuing with the above example, frame analysis engine 126 could compute an overall frame score for a frame using the following equation:

$$s_i = c_1 p_i + c_2 w_i + c_3 e_i \qquad (4)$$

In the above equation, $s_i$ represents the overall frame score for frame i. The frame score is calculated as a sum of the frame-level prominence score $p_i$ multiplied by a first weight $c_1$, the frame-level interaction score $w_i$ multiplied by a second weight $c_2$, and the frame-level face score $e_i$ multiplied by a third weight $c_3$. The three weights 240 could sum to 1 and be selected to reflect the relative contributions of the frame-level prominence score, frame-level interaction score, and frame-level face score to the overall frame score. Thus, a user that cares more about the importance of characters in artwork for the media title may assign a high value to $c_1$, a user that cares more about interactions between characters in artwork for the media title may assign a value to $c_2$, and a user that cares more about the appearances of characters' faces in artwork for the media title may assign a high value to $c_3$.

After frame scores 248 are calculated for all frames 204 in video content 202, frame analysis engine 126 selects one or more frames 204 with high frame scores 248 as representative frames 250 that are candidates for inclusion in artwork for the media title. For example, frame analysis engine 126 could rank frames 204 by descending frame scores 248. Frame analysis engine 126 could then select a certain number of highest ranked frames 204 (e.g., the single frame with the highest frame score, the top 5 frames in the ranking, the top 10 frames in the ranking, the top 100 frames in the ranking, etc.) as representative frames 250. Frame analysis engine 126 could also, or instead, select a variable number of frames 204 with frame scores 248 that exceed a numeric, percentile, or another threshold as representative frames 250.

Frame analysis engine 126 may then output representative frames 250 to one or more users and/or applications that produce artwork for the media title. The user(s) may interact with the application(s) to review representative frames 250, add one or more representative frames 250 to the artwork, edit the representative frame(s) within the artwork, add text to the artwork, and/or perform other operations related to creating the artwork. Because the user(s) are presented with a relatively small number of representative frames 250 as candidates for inclusion in the artwork, the user(s) are able to create artwork for the media title more quickly and efficiently than if the user(s) were required to manually review most or all frames in video content 202 for the media title as part of the process for creating the artwork.

While the operation of face analysis engine 122, character analysis engine 124, and frame analysis engine 126 has been described above with respect to faces and characters in the media title, those skilled in the art will appreciate that the generation of frame scores 248 and selection of representative frames 250 can reflect other attributes or entities in frames 204 and/or video content 202. For example, a first component that is similar to face analysis engine 122 could use one or more embedding models to generate embedded representations of objects, backgrounds, settings, textures, colors, shapes, dialogue, or other entities in video content 202, audio content, and/or other types of content in the media title. The first component could also, or instead, use one or more scoring models to generate scores representing the suitability of the entities for use in artwork for the media title. The first component could also, or instead, use one or more additional machine learning models to recognize the entities in the frames, determine the identities or types of the entities (e.g., a setting that is located in a particular city, a setting that is indoors or outdoors, an object that is a particular type of animal, etc.), and/or determine attributes of the entities (e.g., themes, topics, emotions, sentiments, types of relationships, etc.).

Continuing with the above example, a second component that is similar to character analysis engine 124 could use the embeddings to generate clusters representing the entities, calculate prominence scores 222 for the entities based on the sizes of the clusters, and calculate interaction scores 224 for pairs of entities based on co-occurrences 220 of the pairs of entities in video content 202. The second component could also populate one or more graphs with nodes representing the entities and edges representing interactions or co-occurrences 220 of pairs of entities. The second component could further associate each node with a prominence score for a corresponding entity and/or additional attributes related to the corresponding entity (e.g., a type of object represented by the entity, one or more topics or themes related to the entity, a sentiment of a line spoken by the entity, an emotion conveyed by a facial expression of the entity, etc.). The second component could similarly associate each edge with an interaction score for a corresponding pair of entities and/or additional attributes related to the corresponding pair of entities (e.g., the type of relationship or interaction represented by the edge, emotions or themes associated with the relationship or interaction, etc.).

Continuing with the above example, a third component that is similar to frame analysis engine 126 could combine scores outputted by the first component and second component with a set of weights into frame scores 248 for individual frames of video content 202 in the media title. Each frame score could include a first sub-score that represents the aggregated prominence scores 222 for various entities that appear in a corresponding frame, a second sub-score that represents the aggregated interaction scores 224 for pairs of entities in the corresponding frame, and a third sub-score that represents aggregated scores representing the suitability of the entities for use in artwork for the media title. The third component could also select one or more frames with the highest frame scores 248 as representative frames 250 and output representative frames 250 as candidates for inclusion in artwork for the media title.

Continuing with the above example, the third component could further annotate the selected frames with attributes of entities and/or interactions in the frame. These attributes could include (but are not limited to) the types of entities in the frame; the types of relationships associated with the entities; emotions expressed by the entities in the frame; and/or themes or topics related to the entities or relationships. A user could interact with an application to review the outputted representative frames 250; filter representative frames 250 by entity types, relationship types, emotions, themes, topics, and/or other attributes; and/or perform other operations related to creating artwork for the media title from one or more representative frames 250. Thus, attributes of different types of entities and relationships or interactions between or among the entities can be used to tailor the artwork for the media title to different audiences or uses.

Figure 3:
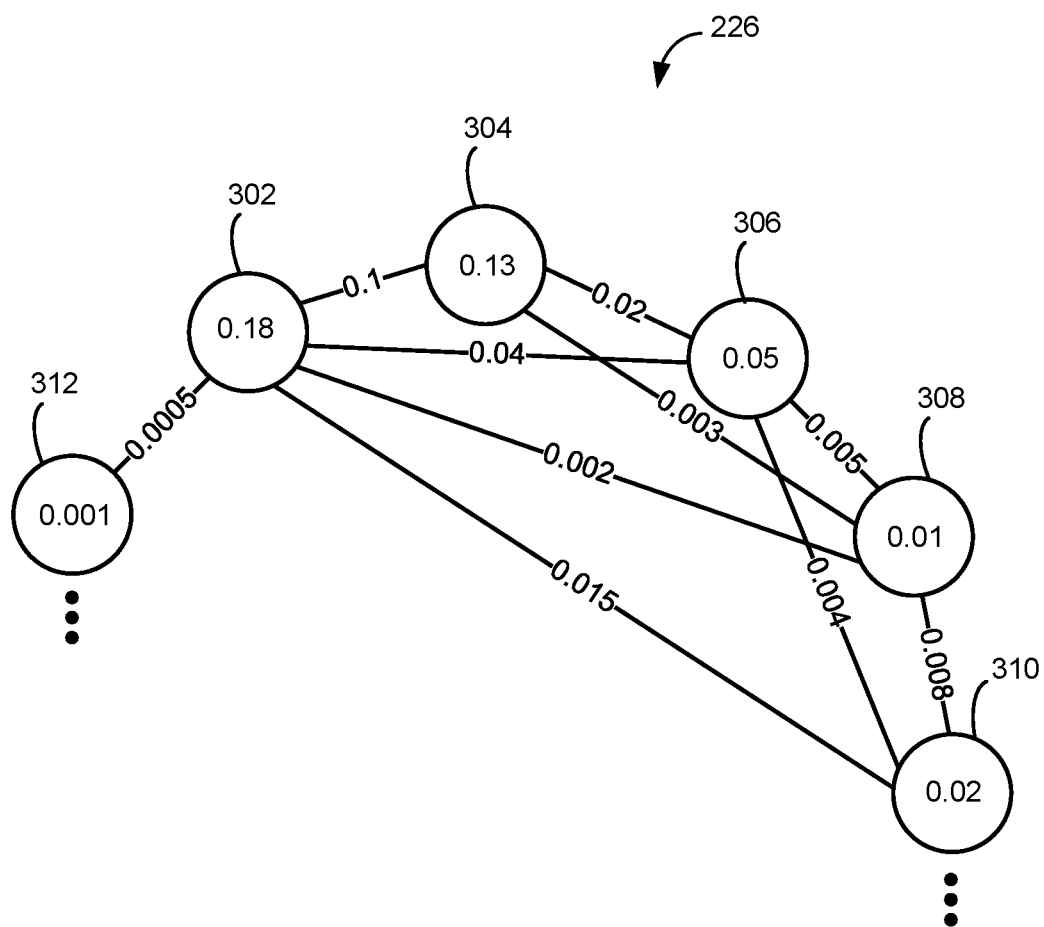
FIG. 3 illustrates an example character interaction graph for a media title, according to various embodiments.

FIG. 3 illustrates an example character interaction graph 226 for a media title, according to various embodiments. As shown in FIG. 3, the example character interaction graph 226 includes a number of nodes 302-312. Each node is associated with a prominence score representing the frequency of occurrence of a corresponding character in the media title. As discussed above, the prominence score may be calculated as the number of frames in which the character appears, divided by the total number of frames that include faces of characters. Thus, prominence scores of 0.18, 0.13, 0.05, 0.01, 0.02, and 0.001 for nodes 302, 304, 306, 308, 310, and 312, respectively, indicate that a first character represented by node 302 appears most frequently in the media title, a second character represented by node 304 appears the second most frequently in the media title, a third character represented by node 306 appears the third most frequently in the media title, a fourth character represented by node 310 appears the fourth most frequently in the media title, a fifth character represented by node 308 appears the fifth most frequently in the media title, and a sixth character represented by node 312 appears the sixth most frequently in the media title.

Certain pairs of nodes 302-304 in the example character interaction graph 226 are also connected by edges representing interactions between the corresponding characters. Each edge is associated with an interaction score representing the amount of co-occurrence of the corresponding pair of characters in the media title. The interaction score may be calculated as the number of frames that include both characters and/or the number of frames in which one character is found within a prespecified number of frames from the other character, divided by the total number of frames that include faces of characters.

In particular, an interaction score of 0.1 for an edge between nodes 302 and 304 indicates that the corresponding characters co-occur in about 10% of frames that include faces of characters, an interaction score of 0.04 for an edge between nodes 302 and 306 indicates that the corresponding characters co-occur in about 4% of frames that include faces of characters, an interaction score of 0.02 for an edge between nodes 304 and 306 indicates that the corresponding characters co-occur in about 2% of frames that include faces of characters, and an interaction score of 0.015 for an edge between nodes 302 and 310 indicates that the corresponding characters co-occur in about 1.5% of frames that include faces of characters. Remaining edges between nodes 302 and 308, 304 and 308, 306 and 308, 306 and 310, 308 and 310, and 302 and 312 have interaction scores of less than 0.01, indicating that the corresponding pairs of characters co-occur in less than 1% of frames that include faces of characters.

Prominence scores and interaction scores stored in character interaction graph 226 can be used to identify important characters and/or interactions in the media title. For example, high prominence scores associated with nodes 302, 304, and 306 could indicate that the corresponding characters are relatively important. These prominence scores can be used to select frames that include the characters' faces as candidates for inclusion in artwork for the media title, recommend the media title to audiences that have shown an affinity for certain attributes of the characters and/or for actors portraying the characters, and/or perform other operations or customizations related to the characters. In another example, high interaction scores associated with pairs of nodes 302 and 304, 304 and 306, and 302 and 306 could indicate that relationships or interactions between the corresponding pairs of characters are relatively important. These interaction scores can be used to select frames that include corresponding pairs of characters for inclusion in artwork for the media title, recommend the media title to audiences that have shown an affinity for certain attributes of the corresponding relationships or interactions, and/or perform other operations or customizations related to the relationships or interactions.

Figure 4:
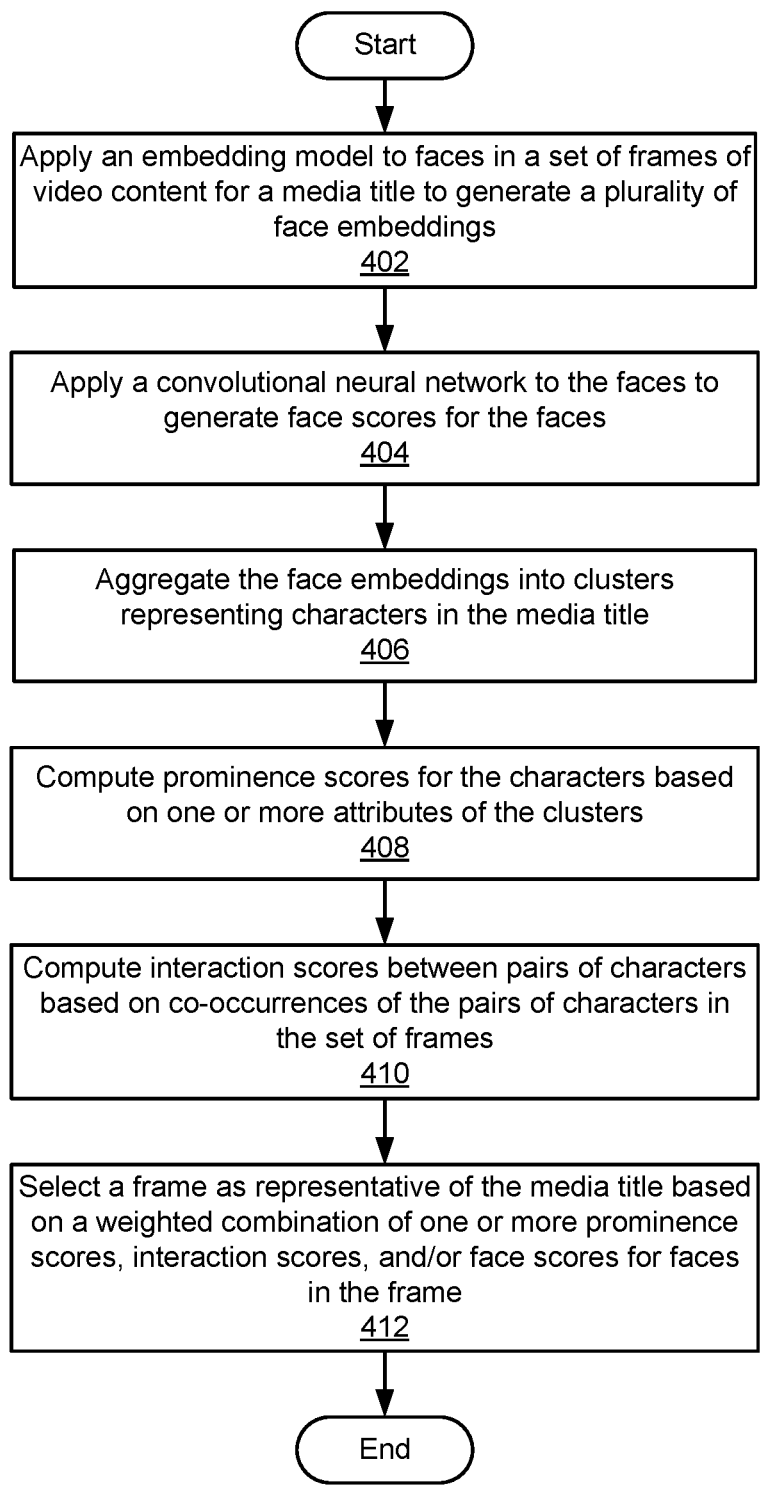
FIG. 4 is a flow diagram of method steps for selecting a frame of video content that is representative of a media title, according to various embodiments.

FIG. 4 is a flow diagram of method steps for selecting a frame of video content that is representative of a media title, according to various embodiments. Although the method steps are described in conjunction with the systems of FIGS. 1-2, persons skilled in the art will understand that any system configured to perform the method steps in any order falls within the scope of the present disclosure.

As shown, face analysis engine 122 applies 402 an embedding model to faces in a set of frames of video content for a media title to generate a plurality of face embeddings. For example, face analysis engine 122 could use a convolutional neural network, residual neural network, and/or another type of embedding model to convert pixel values in a crop of each face into a face embedding that is a fixed-length vector representation of the face's visual attributes in a lower-dimensional latent space.

Face analysis engine 122 also applies 404 a convolutional neural network to the faces to generate face scores for the faces. For example, the convolutional neural network could be trained to distinguish between a first set of faces included in a first set of frames that are selected as representative of one or more media titles and a second set of faces included in a second set of frames that are not selected as representative of the media title(s). Thus, a face score produced by the convolutional neural network from pixel values in a crop of a face could represent the likelihood that the face includes attributes (e.g., facial expression, sharpness, lighting, angle, etc.) that are suitable for use in artwork for the media title.

Next, character analysis engine 124 aggregates 406 the face embeddings into clusters representing characters in the media title. For example, character analysis engine 124 could use a hierarchical clustering technique and/or another type of clustering technique to group the face embeddings produced by face analysis engine 122 into discrete clusters, so that embeddings within a cluster represent faces for the same character.

Character analysis engine 124 then computes 408 prominence scores for the characters based on one or more attributes of the clusters. For example, character analysis engine 124 could calculate a different prominence score for each character in the media title, as represented by a cluster of embeddings representing that character. The prominence score may be computed as the number of face embeddings in the cluster for the character normalized by the number of frames within the set of frames that have at least one face.

Character analysis engine 124 further computes 410 interaction scores between pairs of characters based on co-occurrences of the pairs of characters in the set of frames. For example, character analysis engine 124 could calculate a different interaction score for each pair of characters in the media title. The interaction score may be computed as the number of frames in which a first character in the pair of characters occurs within a prespecified number of frames from a second character in the pair of characters. When two characters do not co-occur, an interaction score of 0 may be assigned to the characters.

Finally, frame analysis engine 126 selects 412 a frame as representative of the media title based on a weighted combination of one or more prominence scores, interaction scores, and/or face scores for faces in the frame. For example, frame analysis engine 126 could calculate an overall frame score for each frame in the set of frames. The overall frame score could include a first sub-score that is a weighted sum of prominence scores for characters with faces that appear in the frame. Within the weighted sum, each prominence score could be multiplied by a weight that is the area of the corresponding face divided by the area occupied by all faces in the frame. When the frame includes faces for two or more characters, the overall frame score could also include a second sub-score that is calculated as a sum of interaction scores for pairs of characters in the frame, normalized by the total number of pairs of characters in the frame. The overall frame score could further include a third sub-score that is a weighted sum of face scores for characters with faces that appear in the frame. Within the weighted sum, each face score could be multiplied by a weight that is the area of the corresponding face divided by the area occupied by all faces in the frame. The overall frame score could then be calculated as a weighted sum of the sub-scores, where the weight associated with each sub-score represents the relative contribution of the sub-score to the frame score. After frame scores are calculated for all frames in the set, frame analysis engine 126 selects a given frame as representative of the media title when the frame has a high frame score. The frame may then be outputted as a candidate for inclusion in artwork for the media title, as discussed above.

In sum, the disclosed techniques identify one or more frames of video content in a media title as representative of the media title. These representative frames can then be used in thumbnails, posters, or other artwork that serves as an introduction, summary, or preview of the media title. One or more machine learning models are applied to some or all frames of video content in the media title to produce multiple types of scores. One type of score includes a prominence score that represents the frequency with which a character appears in the film. The prominence score may be calculated by generating embeddings of faces in the video content using an embedding model, using a clustering technique to group the embeddings into clusters representing different characters, and normalizing the count of embeddings in each cluster by the number of frames in the video content in which faces appear. A second type of score includes an interaction score between two characters that appear in the same frame. The interaction score may be calculated as the number of frames in which one character is found in the same frame as another character and/or occurs within a prespecified number of frames from the other character, normalized by the number of frames in the video content in which faces appear. A third type of score includes a face score for each face found in the frames of video content. The face score may be produced by a machine learning model that is trained to distinguish between a first set of faces included in a first set of frames that are selected for inclusion in artwork for one or more media titles and a second set of faces included in a second set of frames that are not selected for inclusion in artwork for the same or different media titles. The machine learning model thus outputs, for a given crop of a face, a score between 0 and 1 indicating the appropriateness of the face for use in artwork for a media title.

The prominence, interaction, and/or face scores for characters in a given frame can then be combined into an overall frame score representing the suitability of the frame for use in artwork for the media title. For example, the prominence score and/or face score for each character in the frame could be scaled by the area occupied by the character's face divided by the area occupied by all faces in the frame. The overall frame score could then be calculated as a weighted combination of the scaled and/or unscaled prominence, interaction, and face scores associated with faces in the frame.

Overall frame scores for some or all frames of video content in the media title are then used to select one or more frames as candidates for artwork for the media title. For example, the frames could be ranked by descending overall score, and a certain number of highest ranking frames and/or a variable number of frames with overall frame scores that exceed a threshold could be identified as candidates for artwork. The candidates could then be outputted in an application to users that produce the artwork. The users could add portions of one or more outputted frames to the artwork, edit (e.g., cropping, applying color adjustments to, compositing, etc.) the added portions within the artwork, add text to the edited frame(s), and/or perform other image- or text-processing operations to produce the artwork.

One technical advantage of the disclosed techniques relative to the prior art is that, with the disclosed techniques, a subset of frames in video content for a media title can be automatically and efficiently identified as suitable for use in artwork for the media title. Accordingly, the disclosed techniques are faster, more scalable, and incur less resource overhead than prior art techniques that involve individual users interacting with applications to manually review and select video frames in media titles as candidates for artwork. These technical advantages provide one or more technological advancements over prior art approaches.

1. In some embodiments, a computer-implemented method comprises applying an embedding model to a plurality of faces included in a set of frames of video content for a media title to generate a plurality of face embeddings, aggregating the plurality of face embeddings into a plurality of clusters representing a plurality of characters included in the media title, computing a plurality of prominence scores for the plurality of characters based on one or more attributes of the plurality of clusters, and selecting, from the set of frames, a frame of video content as representative of the media title based on one or more prominence scores for one or more characters included in the frame.

2. The computer-implemented method of clause 1, further comprising computing a first interaction score between a first pair of characters included in the one or more characters based on a co-occurrence of the first pair of characters in the set of frames, and selecting the frame of video content as representative of the media title based on the first interaction score.

3. The computer-implemented method of clauses 1 or 2, further comprising computing a second interaction score between a second pair of characters included in the one or more characters, and selecting the frame of video content as representative of the media title based on the second interaction score.

4. The computer-implemented method of any of clauses 1-3, wherein the first interaction score is computed based on a number of frames in which a first character included in the first pair of characters occurs within a prespecified number of frames from a second character included in the first pair of characters.

5. The computer-implemented method of any of clauses 1-4, wherein the frame is selected as representative of the media title based on a weighted combination of the one or more prominence scores and the first interaction score.

6. The computer-implemented method of any of clauses 1-5, further comprising computing a plurality of face scores for the plurality of faces, and selecting the frame of video content as representative of the media title based on one or more face scores that are included in the plurality of face scores and associated with one or more faces included in the frame.

7. The computer-implemented method of any of clauses 1-6, wherein the frame is selected as representative of the media title based on a weighted combination of the one or more prominence scores and the one or more face scores.

8. The computer-implemented method of any of clauses 1-7, wherein computing the plurality of face scores comprises inputting each face included in the plurality of faces into a convolutional neural network, wherein the convolutional neural network is trained to distinguish between a first set of faces included in a first set of frames that are selected as representative of one or more media titles and a second set of faces included in a second set of frames that are not selected as representative of the one or more media titles, and receiving a face score for the face as output of the convolutional neural network.

9. The computer-implemented method of any of clauses 1-8, wherein the frame is selected as representative of the media title based on the one or more prominence scores and one or more sizes of one or more faces for the one or more characters in the frame.

10. The computer-implemented method of any of clauses 1-9, wherein each prominence score included in the plurality of prominence scores is computed based on a number of face embeddings in a corresponding cluster.

11. In some embodiments, one or more non-transitory computer readable media storing instructions that, when executed by one or more processors, cause the one or more processors to perform the steps of applying an embedding model to a plurality of faces included in a set of frames of video content for a media title to generate a plurality of face embeddings, aggregating the plurality of face embeddings into a plurality of clusters representing a plurality of characters included in the media title, computing a plurality of prominence scores for the plurality of characters based on one or more attributes of the plurality of clusters, and selecting, from the set of frames, a frame of video content as representative of the media title based on one or more prominence scores for one or more characters included in the frame.

12. The one or more non-transitory computer readable media of clause 11, wherein the instructions further cause the one or more processors to perform the steps of computing a first interaction score between a first pair of characters included in the one or more characters based on a co-occurrence of the first pair of characters in the set of frames, computing a second interaction score between a second pair of characters included in the one or more characters, and selecting the frame of video content as representative of the media title based on the first interaction score and the second interaction score.

13. The one or more non-transitory computer readable media of clauses 11 or 12, wherein the first interaction score is computed based on a number of frames in which a first character included in the first pair of characters occurs within a prespecified number of frames from a second character included in the first pair of characters.

14. The one or more non-transitory computer readable media of any of clauses 11-13, wherein the frame is selected as representative of the media title based on a weighted combination of the one or more prominence scores, the first interaction score, and the second interaction score.

15. The one or more non-transitory computer readable media of any of clauses 11-14, wherein the instructions further cause the one or more processors to perform the steps of applying a convolutional neural network to the plurality of faces to generate a plurality of face scores, wherein the convolutional neural network is trained to distinguish between a first set of faces included in a first set of frames that are selected as representative of one or more media titles and a second set of faces included in a second set of frames that are not selected as representative of the one or more media titles, and selecting the frame of video content as representative of the media title based on one or more face scores that are included in the plurality of face scores and associated with one or more faces included in the frame.

16. The one or more non-transitory computer readable media of any of clauses 11-15, wherein the frame is selected as representative of the media title based on a weighted combination of the one or more prominence scores and the one or more face scores.

17. The one or more non-transitory computer readable media of any of clauses 11-16, wherein the instructions further cause the one or more processors to perform the steps of computing a first interaction score between a first pair of characters included in the one or more characters based on a co-occurrence of the first pair of characters in the set of frames, and selecting the frame of video content as representative of the media title based on the first interaction score.

18. The one or more non-transitory computer readable media of any of clauses 11-17, wherein the frame is selected as representative of the media title based on the one or more prominence scores scaled by one or more sizes of one or more faces for the one or more characters in the frame.

19. The one or more non-transitory computer readable media of any of clauses 11-18, wherein each prominence score included in the plurality of prominence scores is computed based on a number of face embeddings in a corresponding cluster and a number of frames within the set of frames that have at least one face.

20. In some embodiments, a system comprises a memory that stores instructions, and a processor that is coupled to the memory and, when executing the instructions, is configured to apply an embedding model to a plurality of faces included in a set of frames of video content for a media title to generate a plurality of face embeddings, aggregate the plurality of face embeddings into a plurality of clusters representing a plurality of characters included in the media title, compute a plurality of prominence scores for the plurality of characters based on one or more attributes of the plurality of clusters, and select, from the set of frames, a frame of video content as representative of the media title based on one or more prominence scores for one or more characters included in the frame.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    applying an embedding model to a plurality of faces included in a set of frames of video content for a media title to generate a plurality of face embeddings;
    aggregating the plurality of face embeddings into a plurality of clusters representing a plurality of characters included in the media title, wherein each face embedding included in the plurality of face embeddings is associated with a face of a particular character included in the plurality of characters;
    computing a plurality of prominence scores for the plurality of characters, wherein each prominence score is computed for a given character based on a number of face embeddings included in a cluster that corresponds to the given character and a total number of frames in the video content that include at least one face of a character included in the plurality of characters; and
    selecting, from the set of frames, a frame of video content as representative of the media title based at least in part, on at least one prominence score for at least one character included in the frame.

2. The computer-implemented method of claim 1, further comprising:
    computing a first interaction score between a first pair of characters included in the frame based on a co-occurrence of the first pair of characters in the set of frames; and
    selecting the frame of video content as representative of the media title further based on the first interaction score.

3. The computer-implemented method of claim 2, further comprising:
    computing a second interaction score between a second pair of characters included in the frame; and
    selecting the frame of video content as representative of the media title further based on the second interaction score.

4. The computer-implemented method of claim 2, wherein the first interaction score is computed based on a number of frames in which a first character included in the first pair of characters occurs within a prespecified number of frames from a second character included in the first pair of characters.

5. The computer-implemented method of claim 2, wherein the frame is selected as representative of the media title based on a weighted combination of the at least one prominence score and the first interaction score.

6. The computer-implemented method of claim 1, further comprising:
    computing a plurality of face scores for the plurality of faces; and
    selecting the frame of video content as representative of the media title further based on one or more face scores that are included in the plurality of face scores and associated with one or more faces included in the frame.

7. The computer-implemented method of claim 6, wherein the frame is selected as representative of the media title based on a weighted combination of the at least one prominence score and the one or more face scores.

8. The computer-implemented method of claim 6, wherein computing the plurality of face scores comprises:
    inputting each face included in the plurality of faces into a convolutional neural network, wherein the convolutional neural network is trained to distinguish between a first set of faces included in a first set of frames that are selected as representative of one or more media titles and a second set of faces included in a second set of frames that are not selected as representative of the one or more media titles; and
    receiving a face score for the face as output of the convolutional neural network.

9. The computer-implemented method of claim 1, wherein the frame is selected as representative of the media title further based on the at least one size of at least one face for the at least one character in the frame.

10. One or more non-transitory computer readable media storing instructions that, when executed by one or more processors, cause the one or more processors to perform the steps of:
    applying an embedding model to a plurality of faces included in a set of frames of video content for a media title to generate a plurality of face embeddings;
    aggregating the plurality of face embeddings into a plurality of clusters representing a plurality of characters included in the media title, wherein each face embedding included in the plurality of face embeddings is associated with a face of a particular character included in the plurality of characters;
    computing a plurality of prominence scores for the plurality of characters, wherein each prominence score is computed for a given character based on a number of face embeddings included in a cluster that corresponds to the given character and a total number of frames in the video content that include at least one face of a character included in the plurality of characters; and
    selecting, from the set of frames, a frame of video content as representative of the media title based. at least in part, on at least one prominence score for at least one character included in the frame.

11. The one or more non-transitory computer readable media of claim 10, wherein the instructions further cause the one or more processors to perform the steps of:

computing a first interaction score between a first pair of characters included in the frame based on a co-occurrence of the first pair of characters in the set of frames;
computing a second interaction score between a second pair of characters included in the frame; and
selecting the frame of video content as representative of the media title further based on the first interaction score and the second interaction score.

12. The one or more non-transitory computer readable media of claim 11, wherein the first interaction score is computed based on a number of frames in which a first character included in the first pair of characters occurs within a prespecified number of frames from a second character included in the first pair of characters.

13. The one or more non-transitory computer readable media of claim 11, wherein the frame is selected as representative of the media title based on a weighted combination of the at least one prominence score, the first interaction score, and the second interaction score.

14. The one or more non-transitory computer readable media of claim 10, wherein the instructions further cause the one or more processors to perform the steps of:
applying a convolutional neural network to the plurality of faces to generate a plurality of face scores, wherein the convolutional neural network is trained to distinguish between a first set of faces included in a first set of frames that are selected as representative of one or more media titles and a second set of faces included in a second set of frames that are not selected as representative of the one or more media titles; and
selecting the frame of video content as representative of the media title further based on one or more face scores that are included in the plurality of face scores and associated with one or more faces included in the frame.

15. The one or more non-transitory computer readable media of claim 14, wherein the frame is selected as representative of the media title based on a weighted combination of the at least one prominence score and the one or more face scores.

16. The one or more non-transitory computer readable media of claim 14, wherein the instructions further cause the one or more processors to perform the steps of:
computing a first interaction score between a first pair of characters included in the frame based on a co-occurrence of the first pair of characters in the set of frames; and
selecting the frame of video content as representative of the media title further based on the first interaction score.

17. The one or more non-transitory computer readable media of claim 10, wherein the frame is selected as representative of the media title based on the at least one prominence score scaled by at least one size of at least one face for the at least one character in the frame.

18. A system, comprising:
a memory that stores instructions, and
a processor that is coupled to the memory and, when executing the instructions, is configured to:
apply an embedding model to a plurality of faces included in a set of frames of video content for a media title to generate a plurality of face embeddings;
aggregate the plurality of face embeddings into a plurality of clusters representing a plurality of characters included in the media title, wherein each face embedding included in the plurality of face embeddings is associated with a face of a particular character included in the plurality of characters;
compute a plurality of prominence scores for the plurality of characters, wherein each prominence score is computed for a given character based on a number of face embeddings included in a cluster that corresponds to the given character and a total number of frames in the video content that include at least one face of a character included in the plurality of characters; and
select, from the set of frames, a frame of video content as representative of the media title based. at least in part, on at least one prominence score for at least one character included in the frame.

* * * * *